US012637873B2

(12) United States Patent
     Pitambar Rokade et al.

(10) Patent No.:  US 12,637,873 B2
(45) Date of Patent:      May 26, 2026

(54) TEMPORARY SUPPORT STRUCTURAL SYSTEM FOR POWER LINES

(71) Applicant: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

(72) Inventors: Rajendra Pitambar Rokade, Tamil Nadu Chennai (IN); Santosh Kapuria, Tamil Nadu Chennai (IN); Kanchi Balaji Rao, Tamil Nadu Chennai (IN); Napa Prasad Rao, Tamil Nadu Chennai (IN); Rajagopal Balagopal, Tamil Nadu Chennai (IN)

(73) Assignee: COUNCIL OF SCIENTIFIC AND INDUSTRIAL RESEARCH (AN INDIAN REGISTERED BODY INCORPORATED UNDER THE REIGN. OF SOC. ACT (ACT XXI OF 1860)), New Delhi (IN)

( * ) Notice: Subject to any disclaimer, the term of this patent is extended or adjusted under 35 U.S.C. 154(b) by 241 days.

(21) Appl. No.: 18/027,264

(22) PCT Filed: Sep. 21, 2021

(86) PCT No.: PCT/IN2021/050927
     § 371 (c)(1),
     (2) Date: Mar. 20, 2023

(87) PCT Pub. No.: WO2022/059034
     PCT Pub. Date: Mar. 24, 2022

(65) Prior Publication Data
     US 2023/0332426 A1      Oct. 19, 2023

(30) Foreign Application Priority Data

Sep. 21, 2020    (IN) .............................. 202011040975

(51) Int. Cl.
     *E04H 12/20*          (2006.01)
     *E04H 12/10*          (2006.01)
           (Continued)

(52) U.S. Cl.
     CPC ............. *E04H 12/20* (2013.01); *E04H 12/10* (2013.01); *E04H 12/34* (2013.01); *H02G 7/20* (2013.01)

(58) Field of Classification Search
     CPC ......... E04H 12/10; E04H 12/20; E04H 12/34; H02G 7/20
     See application file for complete search history.

(56) References Cited

U.S. PATENT DOCUMENTS 2,227,609  A  *  1/1941  Troman  ................... F16G 11/12
                                                          267/71
2,986,053  A  *  5/1961  Atman  ................... H01R 11/15
                                                          439/781
           (Continued)

FOREIGN PATENT DOCUMENTS

CN        201236518 Y  *  5/2009
CN        201372599 Y     12/2009
           (Continued)

OTHER PUBLICATIONS

Agrawal et al., "Planning and training reduce restoration time for damaged transmission lines in India," Proceedings of the 9th International Conference on Transmission and Distribution Construction, Operation and Live-Line Maintenance, 2000, pp. 101-108.

(Continued)

*Primary Examiner* — Jessie T Fonseca

(74) *Attorney, Agent, or Firm* — Fish & Richardson P.C.

(57) ABSTRACT

Natural disasters, such as cyclones, earthquakes, landslides, etc., or manmade damages, such as structural member's theft, terrorist attacks, etc., can cause collapse of transmission line towers. If these are not restored in time, there will be monetary loss to utilities as well as loss of service to consumers leading to societal impact. Generally, permanent restoration takes several weeks. Hence, a temporary solution for quick retrieval of power transmission is required. This invention provides a temporary support structural system comprising light weight guyed masts (1) made of readymade robust modules (6 and 7), easy to connect connection system, two pin gimbal joint (8) and easy to construct foundation system (9 and 10). The invention is flexible enough to develop various configurations for single or double circuit transmission lines. It is also scalable and can be used for 33 to 800 kV transmission lines.

5 Claims, 10 Drawing Sheets

(51) Int. Cl.

| | | |
|---|---|---|
| *E04H 12/34* | (2006.01) | |
| *H02G 7/20* | (2006.01) | |

(56) References Cited

U.S. PATENT DOCUMENTS

| | | | | |
|---|---|---|---|---|
| 4,203,267 | A | 5/1980 | Langhorst | |
| 4,211,044 | A * | 7/1980 | Gugliotta | E04B 1/19 |
| | | | | 52/654.1 |
| 4,769,959 | A * | 9/1988 | Lindsey | E04H 12/10 |
| | | | | 343/875 |
| 9,416,555 | B2 | 8/2016 | de Abreu et al. | |
| D831,232 | S | 10/2018 | Dionne et al. | |
| 2005/0001131 | A1 * | 1/2005 | Stevens | E04H 12/10 |
| | | | | 248/351 |
| 2017/0114565 | A1 * | 4/2017 | Lindsey | B64D 1/22 |
| 2019/0356035 | A1 * | 11/2019 | Dominguez | E04H 12/182 |
| 2021/0348415 | A1 * | 11/2021 | Marais | H01Q 1/08 |

FOREIGN PATENT DOCUMENTS

| | | | | | |
|---|---|---|---|---|---|
| CN | 103967314 | A | | 8/2014 | |
| CN | 105756401 | A * | 7/2016 | | |
| CN | 105888353 | A * | 8/2016 | | E04H 12/08 |
| CN | 106120845 | A | | 11/2016 | |
| CN | 108252564 | A * | 7/2018 | | |
| CN | 110984670 | A * | 4/2020 | | |
| CN | 111140067 | A * | 5/2020 | | |
| CN | 112448351 | A * | 3/2021 | | H02G 1/04 |
| JP | 3297212 | B2 | | 7/2002 | |
| WO | WO-2006116863 | A1 * | 11/2006 | | E04H 12/20 |
| WO | WO-2008104837 | A1 * | 9/2008 | | E04H 12/20 |

OTHER PUBLICATIONS

Aristizabal et al., "Transmission line restoration techniques in Colombia, South America," Proceedings of the 6th International Conference on Transmission and Distribution Construction and Live-Line Maintenance, 1993, pp. 293-307.
Lindsey, "Transmission Emergency Restoration Systems for Public Power," Lindsey Manufacturing Co., 2015, pp. 1-15.
Picciano, "Emergency restoration structure," IEEE Technical Conference on Southern Tier, 1990, pp. 37-42.
Pohlman, "The case for universal standards to cover the structural components and practices used in emergency restoration systems," Proceedings of the 9th International Conference on Transmission and Distribution Construction, Operation and Live-Line Maintenance, 2000, pp. 109-116.
Prasad et al., "Transmission line restoration using ERS structure," IEEE India Council International Conference (INDICON), 2017, pp. 1-6.
Schweiner et al., "Transmission line emergency restoration philosophy at Los Angeles Department of Water and Power," Proceedings of the 10th International Conference on Transmission and Distribution Construction, Operation and Live-Line Maintenance, 2003, pp. 11-17.
Vadivel, "Emergency Restoration of High Voltage Transmission Lines", The Open Civil Engineering Journal, 2017, 11:778-785.
International Preliminary Report on Patentability in International Appln. No. PCT/IN2021/050927, mailed on Mar. 30, 2023, 8 pages.
International Search Report and Written Opinion in International Appln. No. PCT/IN2021/050927, mailed on Nov. 29, 2021, 14 pages.

* cited by examiner

8

133.5 kN (a)

267.0 kN (b)

107.0 kN (c)

(a)

(b)

(a)

(b)

TEMPORARY SUPPORT STRUCTURAL SYSTEM FOR POWER LINES

CROSS REFERENCE OF RELATED APPLICATIONS

This application is a U.S. National Phase application under 35 U.S.C. § 371 of International Patent Application No. PCT/IN2021/050927, filed on Sep. 21, 2021, which claims the priority of Indian Patent Application number 202011040975, filed on Sep. 21, 2020, the disclosure of which is incorporated herein by reference in its entirety.

FIELD OF INVENTION

The present invention relates to the field of civil engineering more particularly a temporary support structural system for power/transmission lines. It helps in creating a bypass corridor by providing temporary support to the transmission lines, until the permanent restoration of failed transmission line towers so that the monetary as well as service losses can be minimized.

BACKGROUND AND PRIOR ART OF THE INVENTION

Electricity generated in power plants is transported to distribution substations using high voltage transmission/power lines. These transmission lines are designed to function for different terrains, climatic conditions and physical environments and are always at risk to experience extreme/fatal events, both climate related and manmade. Climate related events include high winds, ice formation, storms, earthquakes, floods, land-slides, erosion and or settlement of foundations and so on. Power transmission interruption due to natural calamities are very often; whereas, the interruption caused by humans are limited. These include human error in design, fabrication or erection of towers and transmission lines, vehicular accidents, member thefts, vandalism, terrorism and maintenance issues.

The transmission line infrastructure is always at certain level of damage risk causing interruption in power supply to the critical infrastructure facilities, also concern to public safety. Power utilities have to be prepared for theses emergencies and hence, it is important to understand the reasons of failures and have plan to attend the same immediately and efficiently. Different kind of failures may occur in transmission line structures, such as tower and or its foundation failure, conductor outages due to failure in splices, failure of strands, ageing, snapping due to falling trees, insulator and its hardware failure, etc.

In above situations it is necessary to restore the power transmission as quickly as possible for the benefit of consumers. The important concern is to minimize the economic impact of the costs associated with the destruction and rebuilding. The cost of rebuilding or restoring a failed transmission line and total losses are dependent of restoration time. Therefore, the emergency restoration plan is seen as combination of technical or engineering processes and financial planning. Reference may be made to Picciano (1990), Aristizabal et al. (1993), Agrawal et al. (2000), Pohlman (2000), Schweiner et al. (2003), Lindsey (2015), Vadivel (2017) and Prasad et al. (2017) wherein an economic justification has been given for the use of emergency restoration of power lines using temporary solution. Further, the need of extensive planning and training for effective implementation in successful restoration of power is explained with the help of numerous examples. It is also highlighted to adopt uniform design practices for temporary restoration system and use of IEEE 1070 standard is recommended.

Based on the literature review, it is found that the research towards the development of temporary support structural system for emergency restoration of power lines is the state-of-the-art. To this, there are different solutions available in market but either their design and construction/fabrication is cumbersome or handling is difficult, reference may be made to Lindsey (1988) and Zhao (2009) wherein the modules of lightweight guyed masts are developed from open cross section, i.e. angles or reference may be made to Doinne (2018) wherein box modules fabricated using plates with large slotted holes. The drawbacks of both the systems are, they are susceptible to local buckling and angles are additionally susceptible to torsional buckling modes. Hence, the design weights will increase compared to normal to overcome these mode of failures. There are some more systems available in market, the reference may be made to Xu (2016) wherein emergency repair poles used for lower voltage lines up to 110 kV or reference may be made to De Abreu (2016) wherein guyed mast solution is provided to support transmission lines. The drawback of these solutions are, that they are not used as temporary support system. Almost in all the systems mentioned above separate box sections are required for connections which increases additional inventory and the gimbal joint is made with spherical ball assembly or shafts with special casting, thus requires precision machining or complicated forged components. Moreover, whole assembly of the gimbal joint needs to be handled at site which is difficult as it is bulky and heavy.

In addition, the available systems design and construction/fabrication is cumbersome, handling is difficult at site and their cost is very high. In view of the above, a cost effective scalable temporary support structural system for power lines with improved, safe and stable light weight design, easy to fabricate and install at site is the need of the hour.

i. PATENT CITATION

1. U.S. Pat. No. 4,769,959A, 13/09/1988, K. E. Lindsey—Temporary power line tower assembly and method of installing same
2. U.S. Pat. No. 9,416,555B2, 16/08/2016, P. E. De Abreu and P. E. De Abreu Jr. —Structure for supporting electric power transmission lines
3. USD831232S, 16/10/2018, A. Dionne and M. Leger—Modular tower segment
4. CN201372599Y, 30/12/2009, Zhao Mingxing and Wei Haiou—Fast first-aid repair system for transmission line
5. CN103967314A, 07/06/2016, Xu Xuefeng et al.—10 kv-110 kv emergency repair pole

II. PUBLICATIONS

1. Picciano, F. G., (1990), "Emergency restoration structure," IEEE Technical Conference on Southern Tier, pp. 37-42.
2. Aristizabal, M. and Cortez, S., (1993), "Transmission line restoration techniques in Colombia, South America," Proceedings of ESMO '93. IEEE 6th International Conference on Transmission and Distribution Construction and Live-Line Maintenance, pp. 293-307.

3. Agrawal, L. N., and Erickson, P. E., (2000), "Planning and training reduce restoration time for damaged transmission lines in India," 2000 IEEE ESMO—2000 IEEE 9th International Conference on Transmission and Distribution Construction, Operation and Live-Line Maintenance Proceedings. ESMO 2000 Proceedings. Global ESMO 2000. The Pow, pp. 101-108.

4. Pohlman, J. C., (2000), "The case for universal standards to cover the structural components and practices used in emergency restoration systems." 2000 IEEE ESMO-2000 IEEE 9th International Conference on Transmission and Distribution Construction, Operation and Live-Line Maintenance Proceedings. ESMO 2000 Proceedings. Global ESMO 2000. The Pow, pp. 109-116.

5. Schweiner, R. J., Twomey, K. E., and Lindsey, K. E., (2003), "Transmission line emergency restoration philosophy at Los Angeles Department of Water and Power," 2003 IEEE 10th International Conference on Transmission and Distribution Construction, Operation and Live-Line Maintenance, 2003 IEEE ESMO. 2003, pp. 11-17.

6. Lindsey, K. E., (2015), "Transmission Emergency Restoration Systems for Public Power", Lindsey Manufacturing Co., pp. 1-15.

7. Vadivel, K. K., (2017), "Emergency Restoration of High Voltage Transmission Lines", The Open Civil Engineering Journal, Vol. 11, (Suppl-2, M6), pp. 778-785.

8. Prasad, D, Khan, M. I., Barua, P. and Agarwal, H., (2017), "Transmission line restoration using ERS structure," 2017 14th IEEE India Council International Conference (INDICON), pp. 1-6.

OBJECTS OF THE INVENTION

1. The main object of the present invention is to provide temporary support structural system for power lines which obviates the drawbacks of the hitherto known prior art as detailed above.

2. Another object of the present invention is to design and fabricate lightweight robust modules with square hollow (closed) sections made of structural grade aluminum alloy for above system which will confirms the qualification criteria as per IEEE 1070 standard.

3. Still another object of the present invention is to design and fabricate easy to connect connections and easy to construct foundation system for the above mentioned system.

4. Yet another object of the present invention is to use the two pin gimbal joint as structural hinge to the guyed mast of above system which will be made of light weight material, easy to handle and easy to assemble or dismantle at site.

5. Further another object of the present invention is to design scalable system to support various voltage class; power lines from 33 to 800 kV.

SUMMARY OF THE INVENTION

An easy to use and plan, temporary support structural system has been developed to support the power/transmission lines during the permanent restoration of failed transmission line tower(s). While developing the present system number of inventive features has been added to it which makes the system more efficient, cost effective and novel compared to other solutions available in market. In this system the modules of guyed mast are designed with closed sections (square hollow sections) made of structural grade aluminum alloy which makes it lightweight, robust and improves overall structural stability. Further an easy to connect connection system and easy to construct foundation system has been developed which reduces the installation time of guyed mast at site. The use of unique two-pin gimbal joint provides hinge support between guyed mast bottom panel and foundation system, this helps in eliminating torsional forces on the mast due to unbalanced lateral loads. Experimental investigations were carried out as per IEEE 1070-2006(R2012) standard at various stages at component level on main parts and accessories and their assemblies at sub-structure level and on prototype as per IS: 802 (Part III)—1978 (Reaffirmed 2003) and IEC 60652: 2002 for the design loads calculated as per IS 802 (Part 1/Sec 1): 2015 for a system equivalent to 220 kV single circuit transmission line tower to ascertain the structural responses for their comparison with the design standards values. The design, development and experimental works has been completed. This is a scalable system, which provides support to various voltage class power lines from 33 to 800 kV.

Performance evaluation of demo temporary support structural system for power line having a typical configuration (double circuit) with a typical voltage class (400 kV) suspension type tower confirming to IS 802 (Part 1/Sec 1): 2015 and CBIP Manual on Transmission Lines Publication No. 323. July 2014 has been observed over three years' period under practical conditions.

BRIEF DESCRIPTION OF THE FIGURES

The present invention is illustrated in FIG. 1 to 10 of the drawings accompanying this specification. In the drawings like reference numbers/letters indicate corresponding parts in the various figures.

STATEMENT OF THE INVENTION

Figure 1:
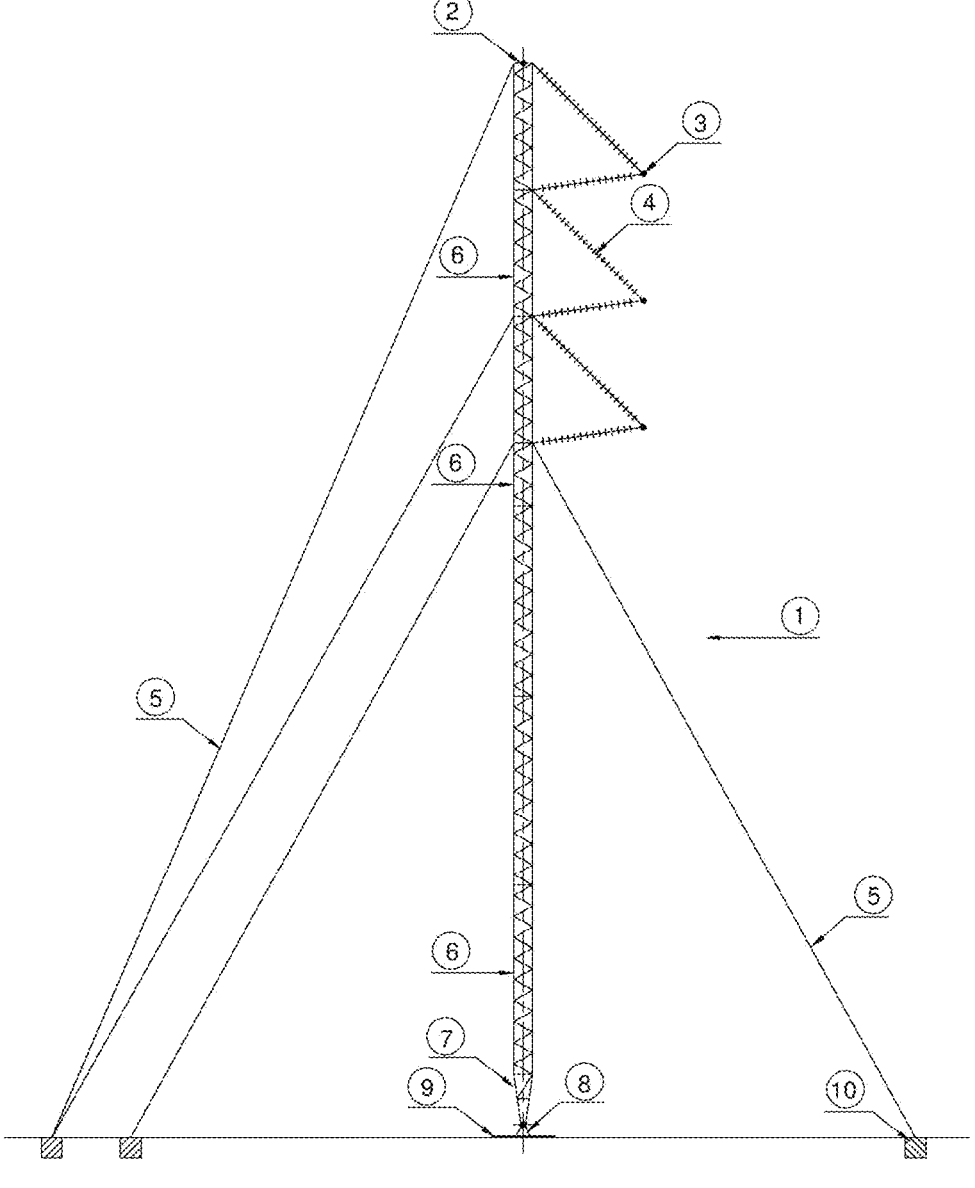
FIG. 1 represents the elevation view of a typical temporary support structural system to power line indicating all the main components/parts of the system.
Figure 2:
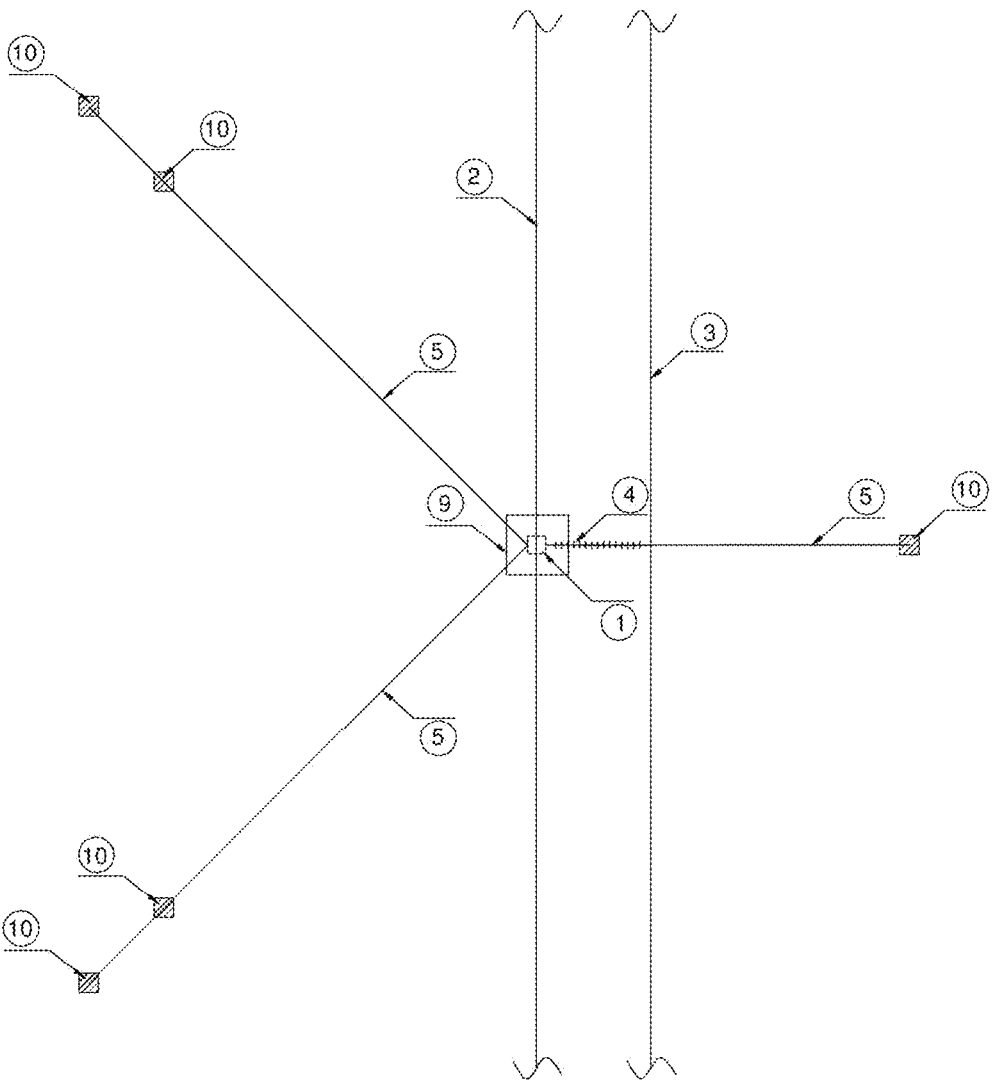
FIG. 2 represents the plan view of a typical temporary support structural system to power line indicating all the main components/parts of the system.
Figure 3:
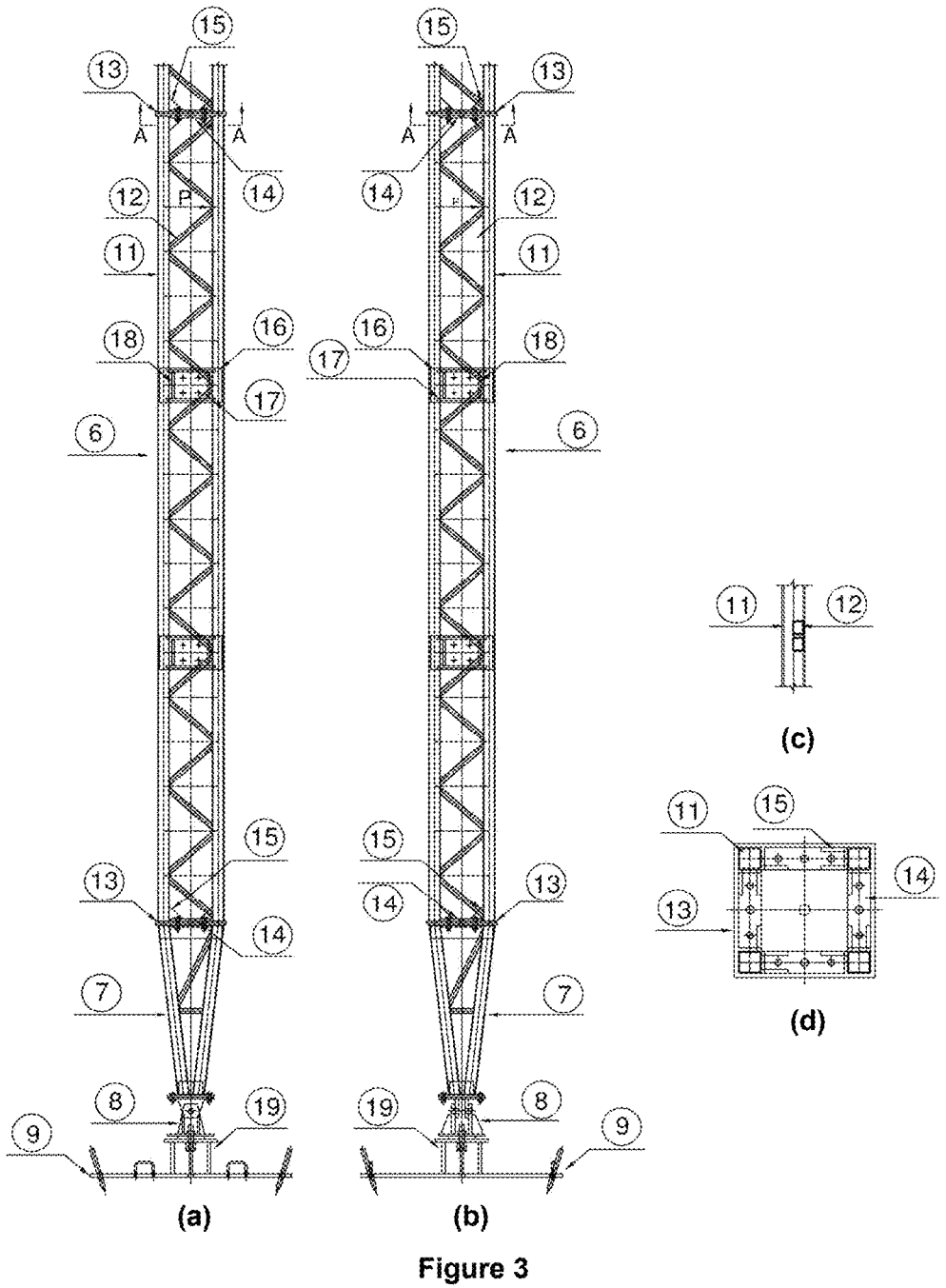
FIGS. 3 (a, b, c and d) represent the elevation, and side view, view on P (shown in FIGS. 3(a) and 3(b)) and view on section A-A (shown in FIGS. 3(a) and 3(b)) respectively of the assembly of bottom part including robust panel, bottom panel, gimbal joint and foundation plate of a typical temporary support structural system for power line indicating the main components of the system and individual parts of each component.
Figure 4:
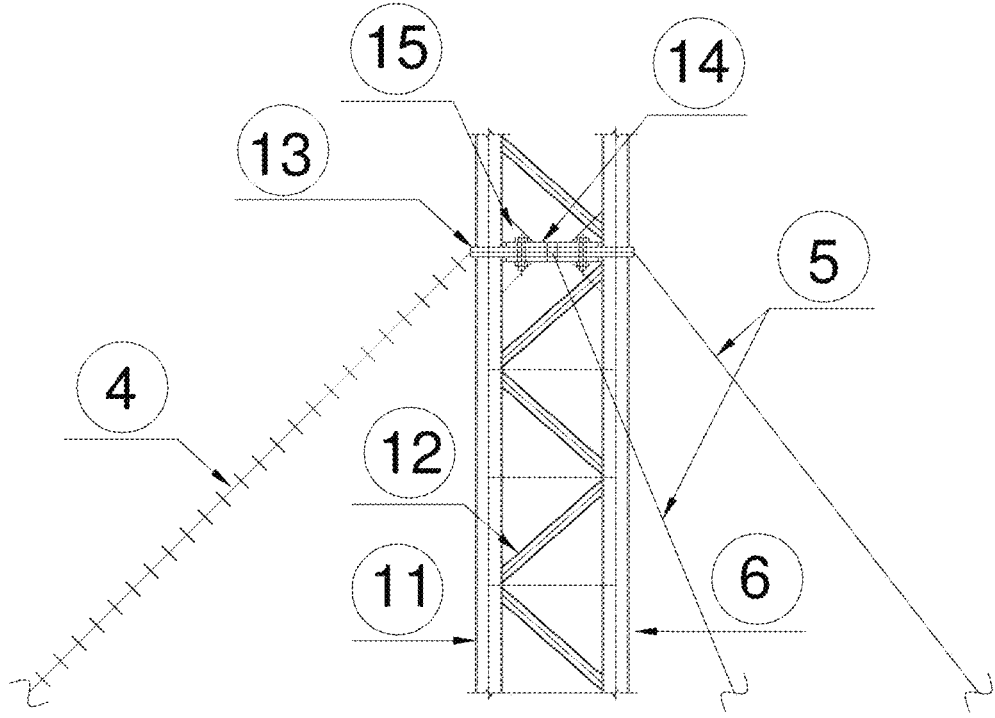
FIG. 4 represents the easy to connect connections for modules and guy wires, this will reduce number of additional components used in connections and thus the inventory carrying cost at site will be reduced.
Figure 5:
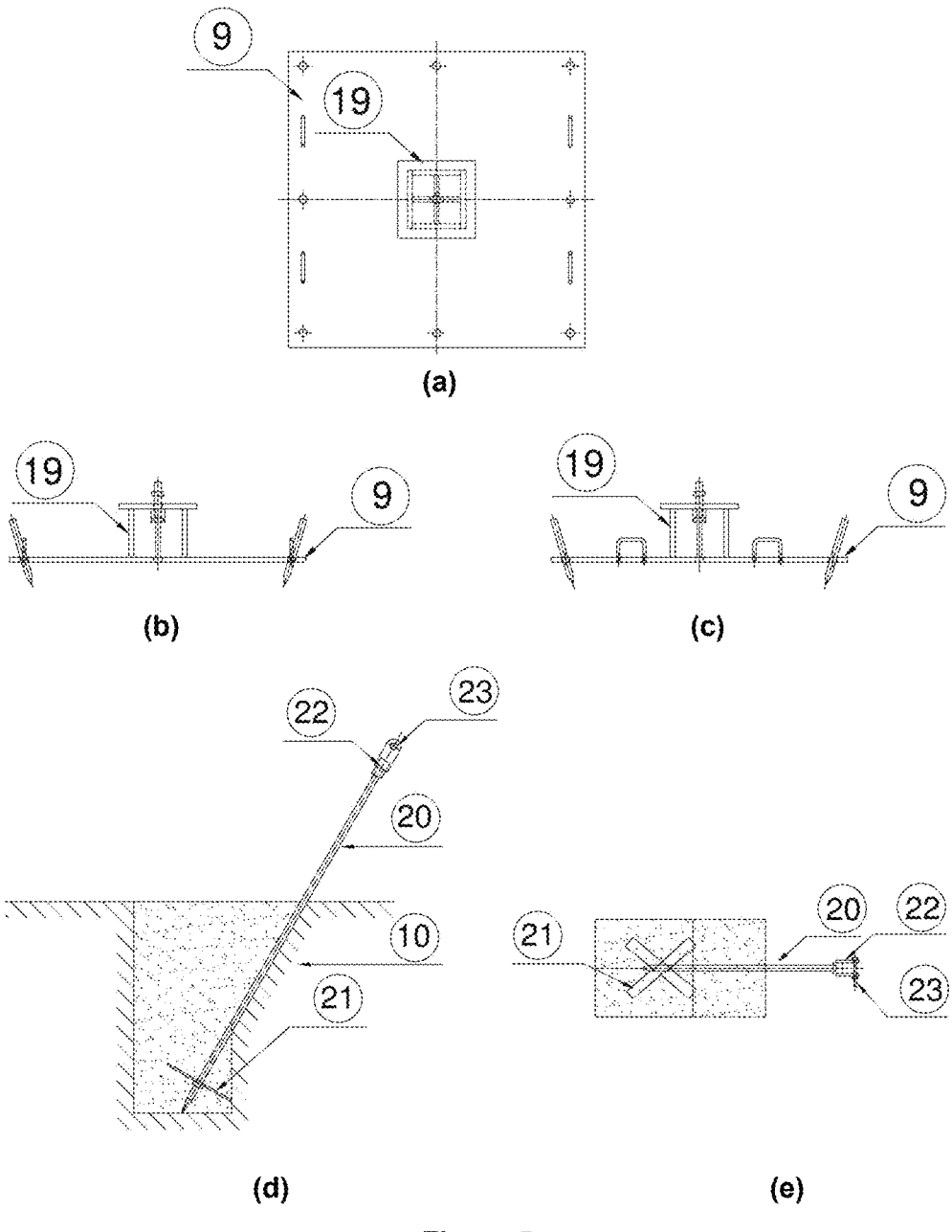
FIGS. 5 (a, b, c, d and e) represent the easy to construct foundation system for the guyed mast (FIG. 5(a) Plan View, FIG. 5(b) Elevation and FIG. 5(c) Side View) and guy wire anchors (FIG. 5(d) Cross-Section View and FIG. 5(e) Plan View) respectively. Use of these foundation systems will reduce overall installation time of temporary support structural system at site.
Figure 6:
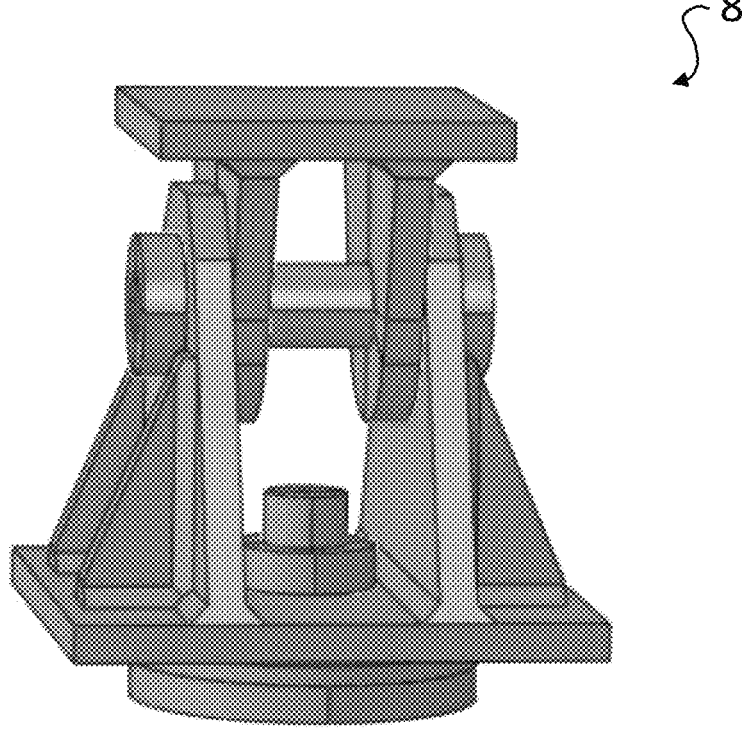
FIG. 6 represents the unique two pin gimbal joint used as hinge in between the guyed mast bottom panel and mast foundation system.

Accordingly, the present invention provides temporary support structural system for power lines which comprises
a. modular guyed mast (1) supporting ground wire (2) and plurality of conductors (3) through the plurality of insulated cross arms/insulator strings (4);
b. the guyed mast (1) is formed using plurality of various length lightweight modules (6) supported over the lightweight bottom conical panel (7) by connecting end to end in vertical direction through panel end plates (13) part of easy to connect efficient connection system;
c. the lightweight unique two pin gimbal joint (8) is used as structural hinge between the bottom conical panel (7) and easy to construct mast foundation plate (9) of guyed mast;
d. the guyed mast (1) is supported at regular intervals in vertical direction by means of guy wires (5) made of steel wire ropes, one end of the guy wires is connected to the module end plates (13) using bulldog clamps whereas the other end with thimble is connected to easy to construct anchor foundation system (10).

In an embodiment of the present invention a temporary support structural system for power lines is developed which obviates the drawbacks of the hitherto known prior art.

In another embodiment of the present invention the design is carried out for the fabrication of lightweight robust modules with square hollow (closed) sections made of structural grade aluminum alloy for above system which confirmed the qualification criteria as per IEEE 1070 standard.

In yet another embodiment of the present invention the design and fabrication of easy to connect connections and easy to construct foundation system is carried out for the above mentioned system.

In still another embodiment of the present invention, use of two pin gimbal joint as structural hinge to the guyed mast of above system which will be made of light weight material, easy to handle and easy to assemble or dismantle at site is demonstrated.

In further another embodiment of the present invention the scalable system is designed to support the various voltage class: power lines from 33 to 800 kV.

DETAILED DESCRIPTION OF THE INVENTION

Details of the present invention are shown in FIGS. 1 to 6. The proposed temporary support structural system in the form of modular guyed mast (1) is used to support the ground wire (2) and plurality of conductors (3). The conductors are supported through the plurality of insulated cross arms/insulator strings (4). The guyed mast is formed using plurality of various length lightweight modules (6) made of structural grade aluminum alloy and connecting end to end in vertical direction over the lightweight bottom conical panel (7). The guyed mast is supported at regular intervals in vertical direction by means of guy wires (5) made of steel wire ropes. The other end of guy wire is connected to easy to construct anchor foundation system (10).

The lightweight unique two pin gimbal joint (8) made of structural grade aluminum alloy is used as structural hinge between the easy to construct mast foundation plate (9) and bottom conical panel (7) of guyed mast.

The leg (11) and bracing (12) members of robust lightweight panels (6) and lightweight bottom conical panel (7) are designed and fabricated using closed (square hollow) sections made of structural grade aluminum alloy. The lightweight end plate of the panels (13) are strengthened with the strengthening plates (14) designed and fabricated from structural grade aluminum alloy to facilitate the end to end connection of panels and direct connection of guy wires (5) and any one arm of insulated cross arms (4). Further plurality of stiffener plates (15) to increase the panel end stiffness against the lateral loads causing bending of individual panel. The insulator plate (16) strengthened with additional plates (17 and 18) are provided at regular intervals in panel. The insulator plate (16) are provided to facilitate the direct connection of insulated cross arm (4) with panels (6) of guyed mast (1). The assembly of panels (6) and bottom conical panel (7) are supported over the unique two pin gimbal joint (8), this joint (8) is placed over the box (19) provided above the foundation plate (9).

The easy to construct guy wire anchor foundation system (10) consists of an anchor rod (20) connected at bottom end with cross plates (21), which increases its uplift force resistance capacity and top end with coupler (22) welded with gusset plates (23) to facilitate the connection guy wire (5) through turn buckle and pin.

The above explained components form the present invention which is light weight as all the components and accessories are made of structural grade aluminum alloy except the hardwares and fixtures. It is easy to use and plan, compact yet economical, easy to transport and handle at site due to lightweight, easy to assemble and dismantle, scalable cost effective system to support power lines during the failure of transmission line towers.

Although the invention has been described in detail herein, it should be understood that the invention is not limited to the embodiments herein disclosed. Various changes, substitutions and modifications can be made thereto by those skilled in the art without departing from the spirit or scope of the invention as described and defined by the appended claims.

EXAMPLES

The following examples given by way of illustration of the working of the invention in actual practice and should not be construed to limit the scope of the present invention in any way.

Example-1

Figure 7:
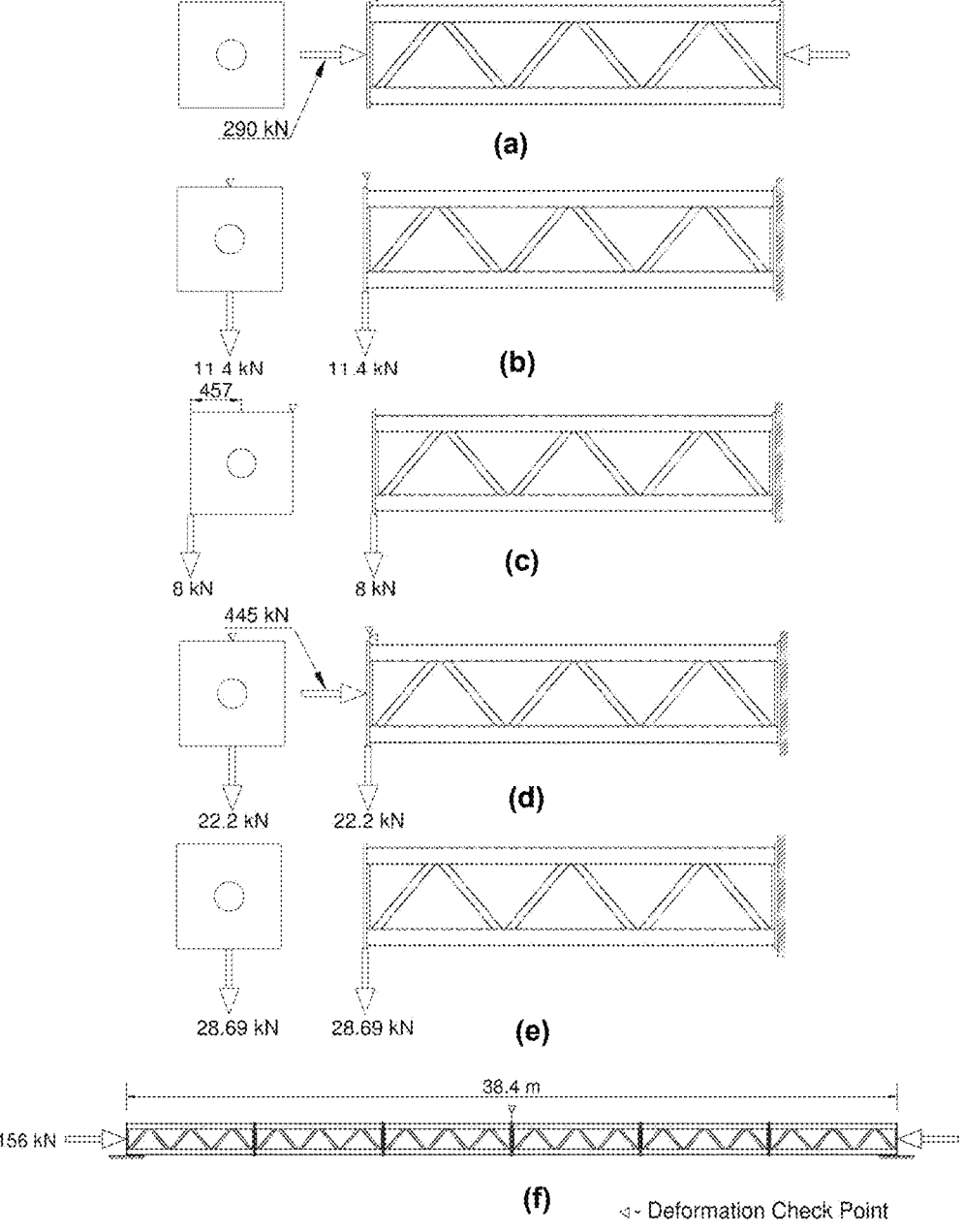
FIGS. 7 (a, b, c, d, e and f) represent respectively the schematic diagrams of test qualification criteria for robust modules/panels as per IEEE 1070 standard (FIG. 7(a) Compressive load test, FIG. 7(*b*) Cantilever load test, FIG. 7(*c*) Torsion load test, FIG. 7(*d*) Compressive and cantilever load test, FIG. 7(*e*) Ultimate strength bending-bolts and welds and FIG. 7(*f*) Column buckling test).

Based on the typical configuration of temporary support structural system numerical results and analytical equations are derived to design its components and accessories. These components and accessories are designed for the various probable failure modes occur in an actual system under the combinations of loads applied/occur on the system during its service life. FIGS. 7 (*a* to *f*) show the schematic of six number of tests suggested in IEEE 1070 standard for 6.4 m (21 ft) long panel, covering all its possible failure modes. The experiment compression of the columns indicated in FIG. 7 (*a*) is conducted by placing the 6.4 m (21 ft) long panel on rollers supported on levelled floor. To avoid stress concentration on end plates due to the test load application, thick steel plates are attached to the end plates. An anchor rod is passed through the centre hole provided in end plates, whose one end is locked with lock nut and a stressing jack is provided on the other end for test load application. Throughout the test the panel axial deformation and strains for various members are measured/monitored. For the tests indicated in FIGS. 7 (*b*) to (*e*) for bending of columns (b), torsion strength (c), combined bending and compression test (d) and ultimate strength bolts/welds on 6.4 m long panel (e), special test setup is designed and fabricated for conducting these tests. Test loads are applied using servo controlled hydraulic actuators in close loop circuit and the test loads are monitored using different load cells of 10 kN, 50 kN and 500 kN capacity. The structural responses e.g. panel end displacement in axial compression and bending direction are measured using total station theodolite and LVDT sensors and strain gauges are applied to various members in panel for measuring the strains during testing. The column buckling test indicated in FIG. 7 (*f*) is conducted by end to end connection of six numbers of 6.4 m long panels, the test setup, load application and response measurement procedure is same as compression of columns (a) test. The designed panels have passed all the tests suggested as above and the residual displacement were well within the values limits as suggested in IEEE standard which is in most cases to the tune of fraction of mm or degree.

Figure 8:
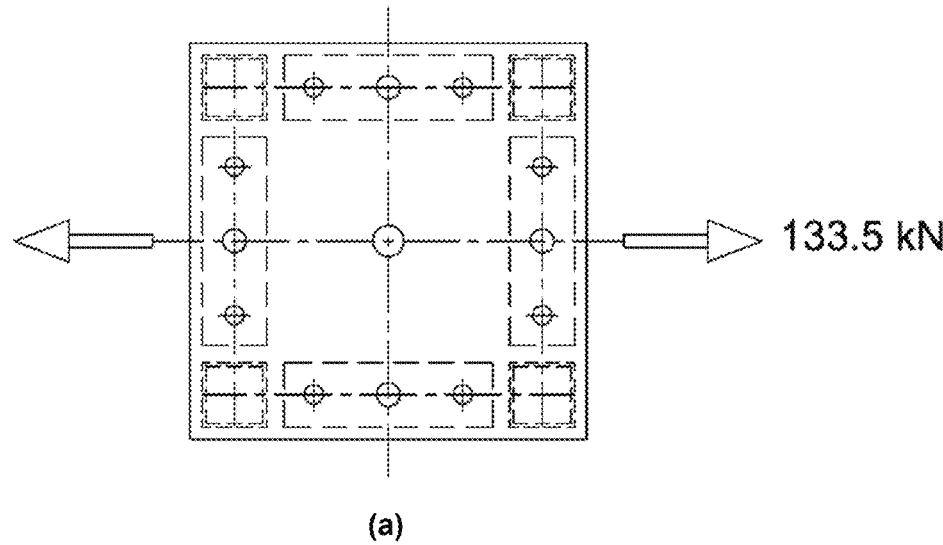
FIGS. 8 (*a*, *b* and *c*) represent the schematic diagrams of test qualification criteria for the temporary support structural systems accessories (i, iii and v) as per IEEE 1070 standard.
Figure 8:
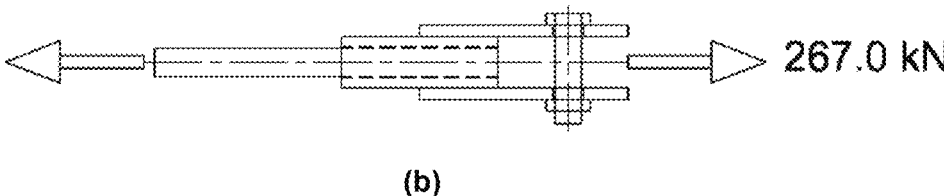
Figure 8:
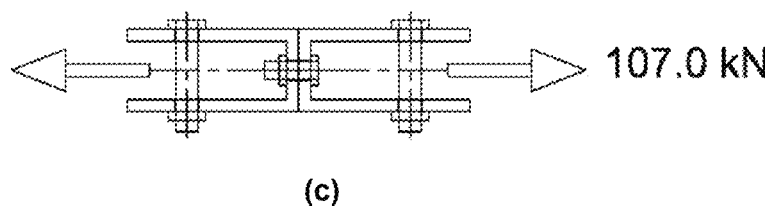

The tests on different accessories of temporary support structural system as suggested in IEEE 1070 standard are shown in FIGS. 8 (*a, b* and *c*) e.g. the guy plate load test (a) for panel end plate, tension load test (b) on guy wire anchor rod and end coupler and bolt and nut ultimate strength test (c) are carried out. All the accessories withstand to the test loads successfully.

Example-2

Figure 9:
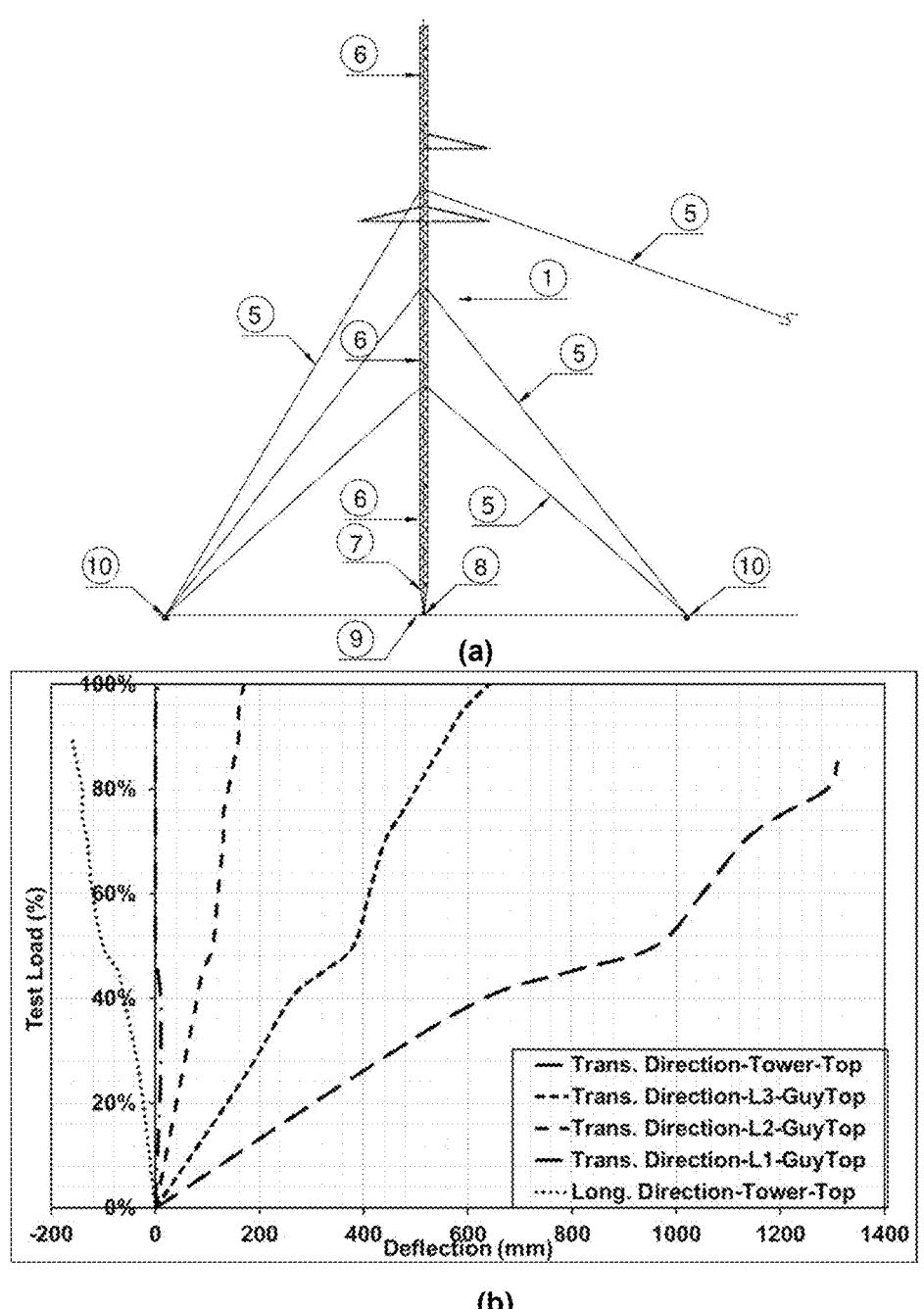
FIGS. 9 (*a* and *b*) represent the test set-up for the prototype test of a temporary support structural system equivalent to a typical 220 kV single circuit power/transmission line tower (a) and the plot of the deflection/displacements measured during the application of critical test load case at various guy wire levels and tower/guyed mast top in transverse as well as in longitudinal direction.
Figure 10:
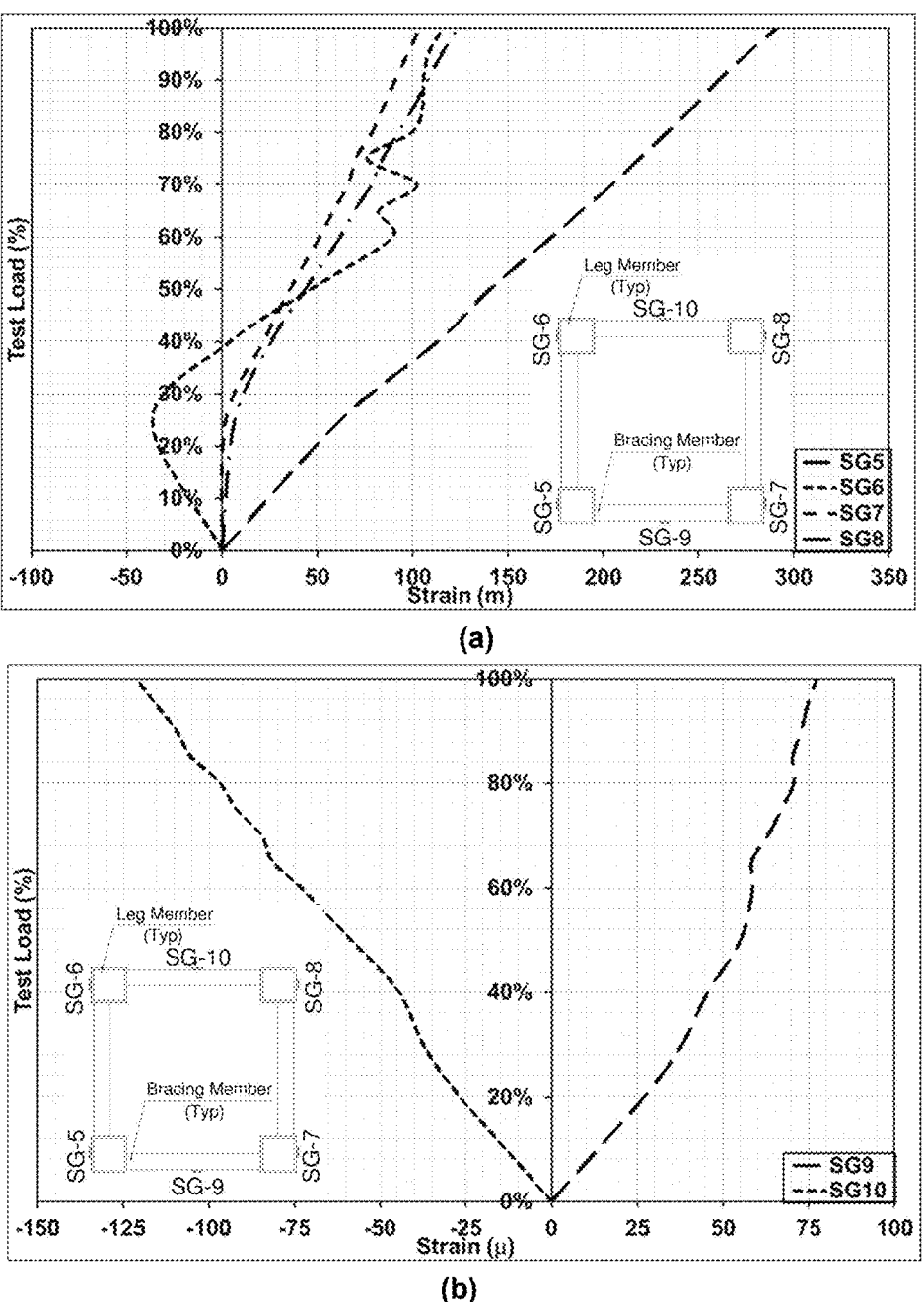
FIGS. 10 (*a* and *b*) represent the strain variation in leg (a) and bracing (b) members of first panel after the bottom conical panel of guyed mast with respect to the percentage of applied test load during the prototype test of a temporary support structural system equivalent to a typical 220 kV single circuit power/transmission line tower.

Prototype test was conducted on present invention i.e. temporary support structural system for an equivalent to 220 kV single circuit suspension type transmission line tower. The guyed mast for equivalent system was erected on test pad and rigging was carried out using steel wire ropes for the application of test loads at various load points, At the tower end of load points, load cells were employed to monitor the test loads. The other ends of wire ropes were connected to hydraulic actuators for load applications. The loads cells were calibrated with the standard proving rings and real time digital control system. Further the real time digital control system is connected with the load cells and hydraulic actuators in servo control close loop circuit. The equivalent guyed mast of present invention was tested as per IS: 802 (Part III)—1978 (Reaffirmed 2003) and IEC 60652:2002 guidelines for the test loads derived from IS 802 (Part 1/Sec 1): 2015 for 220 kV voltage class. To maintain the initial stability and verticality of guyed mast the guy wire pretensions kept 5% of the breaking load of respective guy wire. The guy wire tensions were monitored throughout the test using load cells at anchor end and found to be in limits. FIG. 9 (*a*) shows the test setup and deformed shape of tower at 100% test loads. FIG. 9 (*b*) provides the plot of guyed mast deflection with respect to percentage of test load for guy wire locations at various levels and for tower top in transverse and longitudinal directions. The mast deflections are as expected mostly linear throughout the test. FIG. 10 (*a*) gives the strain variation with respective percentage of test load for leg members of first panel after bottom conical panel. Throughout the test all the leg members were in compression expect one leg was in small tension in initial stages of test, this is due to the guy wire pretension. FIG. 10 (*b*) provides the strain variation with respective percentage of test load for bracing members in lateral load application direction of first panel after bottom conical panel. The strain values were almost linear and as expected, one bracing was in compression whereas the other one was in tension. All the measured stresses in different members of test structure were well within the limit of elastic range. This is the main requirement of scalable and repeat use structure.

The results of experimental investigations indicated in above examples proved that all the envisaged objectives related to the invention are successfully achieved.

Advantages of the Present Invention

The main advantages of the present invention are:
1. It is an easy to plan and use system.
2. Compact and economically affordable system.
3. Usage of Lightweight materials makes it easy to transport at remote locations of power line tower failure sites.
4. Simple to fabricate, requires less hardware's with the innovative easy to connect connection and easy to construct foundations system.
5. This modular system is easy to assemble and flexible enough to develop various configurations for different voltage class transmission lines (33 to 800 kV).
6. It's a cost effective solution to its closest prior arts.
7. The prefabricated modules/panels for guyed mast designed with closed (square hollow) sections made of structural grade aluminum alloy makes it lightweight, robust and structurally more stable.
8. All the components and accessories of present invention are analyzed and designed using finite element software's and proof tested for the qualification criteria as per the IEEE 1070 standard,
9. A prototype of temporary support structural system equivalent to 220 kV single circuit transmission line tower is tested for the design loads calculated as per IS 802 (Part 1/Sec 1): 2015 and the test carried out as per IS: 802 (Part III)—1978 (Reaffirmed 2003) and IEC 60652:2002 standards.
10. The structural performance of this system is monitored for long term (more than 3 years) using a demo structure simulating temporary support structural system equivalent to 400 kV double circuit transmission line suspension type tower confirming to IS 802 (Part 1/Sec 1): 2015 and CBIP Manual on Transmission Lines Publication No. 323. July 2014.

We claim:
1. A temporary support structural system for power lines comprising:
   a plurality of modules including a first module and a second module, each module comprising legs, braces, and an end plate;
   a plurality of insulated cross arms;

a first insulator plate between the end plate of the first module of the plurality of modules and the end plate of the second module of the plurality of modules, wherein the first insulator plate is configured to connect to a first insulated cross arm of the plurality of cross arms;

one or more guy wires comprising steel wire ropes;

a ground wire on an uppermost of the plurality of modules;

a plurality of conductors supported by the plurality of insulated cross arms;

a bottom conical panel;

a two pin gimbal joint;

an anchor foundation system comprising anchor rods; and a mast foundation plate, the plurality of modules being stacked on and supported by the bottom conical panel and being connected end to end in a vertical direction through the end plates, wherein the end plate of the first module of the plurality of modules is nearer to the bottom conical panel than is the end plate of the second module of the plurality of modules, wherein the two pin gimbal joint is used as a structural hinge between the bottom conical panel and the mast foundation plate, wherein the plurality of modules is supported at intervals in the vertical direction by the one or more guy wires, a first end of each of the one or more guy wires being connected to the respective end plate using bulldog clamps, a second end of each of the one or more guy wires being connected with a thimble to a respective one of the anchor rods of the anchor foundation system, and wherein the mast foundation plate is directly placed on compacted soil.

2. The temporary support structural system as claimed in claim 1, wherein the plurality of modules and the bottom conical panel comprise square hollow sections and plates of a structural grade aluminum alloy material.

3. The temporary support structural system as claimed in claim 1, wherein the legs and braces of each of the plurality of modules and wherein the bottom conical panel comprises legs and braces, and wherein all the legs and braces comprise square hollow sections.

4. The temporary support structural system as claimed in claim 1, wherein each end plate of the plurality of modules is configured to facilitate the end to end connection of each of the modules in the vertical direction as well as configured to permit a direct connection of any of the one or more guy wires with each end plate and any insulated cross arm of the plurality of insulated cross arms with the end plate.

5. The temporary support structural system as claimed in claim 1, further comprising a second insulator plate provided at an interval apart from the first insulator plate in a vertical direction and in between any of the end plates, wherein the second insulator plate is configured to connect to at least a second insulated cross arm of the plurality of insulated cross arms.

* * * * *